US006959592B2

(12) United States Patent
Caretta

(10) Patent No.: US 6,959,592 B2
(45) Date of Patent: *Nov. 1, 2005

(54) METHOD AND SYSTEM FOR MONITORING THE DEFORMATIONS OF A TIRE IN MOTION

(75) Inventor: Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 266 days.

This patent is subject to a terminal disclaimer.

(21) Appl. No.: 10/149,395

(22) PCT Filed: Dec. 12, 2000

(86) PCT No.: PCT/EP00/12615

§ 371 (c)(1),
(2), (4) Date: Sep. 13, 2002

(87) PCT Pub. No.: WO01/45968

PCT Pub. Date: Jun. 28, 2001

(65) Prior Publication Data

US 2003/0046992 A1 Mar. 13, 2003

Related U.S. Application Data

(60) Provisional application No. 60/173,553, filed on Dec. 30, 1999.

(30) Foreign Application Priority Data

Dec. 22, 1999 (EP) .............................................. 99125692

(51) Int. Cl.⁷ .............................................. G01M 17/02
(52) U.S. Cl. ......................................... 73/146; 73/146.2
(58) Field of Search ................................ 73/146–146.8

(56) References Cited

U.S. PATENT DOCUMENTS

| | | | |
|---|---|---|---|
| 3,382,908 A | 5/1968 | Palmquist et al. | |
| 4,225,238 A | 9/1980 | Rottenkolber | |
| 4,918,976 A | 4/1990 | Fogal, Sr. | |
| 5,247,831 A | 9/1993 | Fioravanti | |
| 5,303,756 A | 4/1994 | Hill | |
| 6,298,889 B1 | 10/2001 | Smith | |
| 2003/0050743 A1 | 3/2003 | Caretta et al. | |

FOREIGN PATENT DOCUMENTS

| | | |
|---|---|---|
| DE | 39 16 176 A1 | 11/1990 |
| DE | 42 42 109 C 2 | 6/1994 |

(Continued)

OTHER PUBLICATIONS

Celeri, F. et al., "A Method for the Evaluation of the Lateral Stability of Vehicles and Tires", Society of Automotive Engineers, International Automobile Tire Conference, Toronto, Canada, Oct. 22–24, 1974, pp. 1–9.

U.S. Appl. No. 09/959,250, filed Oct. 22, 2001, Ratti et al.

U.S. Appl. No. 10/227,226, filed Aug. 26, 2002, Caretta et al.

Primary Examiner—Edward Lefkowitz
Assistant Examiner—Jermaine Jenkins
(74) Attorney, Agent, or Firm—Finnegan, Henderson, Farabow, Garrett, & Dunner, L.L.P.

(57) ABSTRACT

A system for monitoring deformations of a moving tire mounted on a rim associated with a vehicle includes a moving station and a fixed station. The moving station is operatively coupled to the rim. The moving station measures, at least intermittently and in at least one direction, a distance between the moving station and an inner surface of the tire. The fixed station is operatively coupled to the vehicle. The fixed station receives from the moving station, at least intermittently, at least one first signal associated with the measurement. The moving station measures the distance within a time interval when a first antenna associated with the moving station and a second antenna associated with the fixed station are in proximity to each other. Related methods for monitoring deformations of a moving tire mounted on a rim associated with a vehicle are also disclosed.

48 Claims, 10 Drawing Sheets

FOREIGN PATENT DOCUMENTS

| | | |
|---|---|---|
| DE | 43 26 976 A1 | 2/1995 |
| DE | 196 40 834 | 4/1998 |
| DE | 197 44 611 A1 | 4/1999 |
| EP | 0 197 813 A1 | 10/1986 |
| EP | 0 689 950 A2 | 1/1996 |
| EP | 0 887 211 A1 | 12/1998 |
| WO | WO 93/25400 | 12/1993 |
| WO | WO 94/00306 | 1/1994 |
| WO | WO 98/14338 | 4/1998 |
| WO | WO 01/08908 | 2/2001 |
| WO | WO 01/62525 | 8/2001 |

METHOD AND SYSTEM FOR MONITORING THE DEFORMATIONS OF A TIRE IN MOTION

CROSS-REFERENCE TO RELATED APPLICATIONS

This application is a national stage entry under 35 U.S.C. § 371 from International Application No. PCT/EP00/12615, filed Dec. 12, 2000, in the European Patent Office, the contents of which are relied upon and incorporated herein by reference; additionally, Applicants claim the right of priority under 35 U.S.C. § 119(a)–(d) based on patent application No. 99125692.6, filed Dec. 22, 1999, in the European Patent Office; further, Applicants claim the benefit under 35 U.S.C. § 119(e) based on prior-filed, copending provisional application No. 60/173,553, filed Dec. 30, 1999, in the U.S. Patent and Trademark Office.

BACKGROUND OF THE INVENTION

1. Field of the Invention

The present invention relates to a method and system for monitoring the deformations of a tyre in motion.

In particular, the present invention relates to the possibility of determining the deformations of the carcassstructure of a tyre from inside the structure, for example in order to provide automatic intervention actuated or commanded by the driver, in the driving and/or control system of the vehicle, to change the vehicle's behaviour according to measurements made on the tyre.

2. Description of the Related Art

There are known prior art devices for measuring characteristic parameters such as pressure and temperature inside a tyre.

Patent application EP 887211 describes a tyre monitoring system comprising a sensor which is positioned inside the tyre and is enabled to create an electrical impulse when the said sensor passes through the footprint area formed by the contact of the tyre with the ground during rolling. The system described in this patent also comprises means for finding the ratio of the said electrical impulse to the duration of one revolution of the tyre and means for transmitting the said ratio to a processing unit within the vehicle.

In particular, the sensor is placed within the tread of the tyre in such a way that the said electrical impulse has a first peak at the entry of the sensor into the footprint area and a second peak at the exit from the footprint area.

According to the teaching of this patent, the ratio between the time elapsed between the two peaks and the period of a complete revolution makes it possible to know the extent of flattening of the tyre during the travel of the vehicle.

This is because the sensor determines the instant of entry into the footprint area and the instant of exit from the area. It is thus possible to measure the length of this area, if the angular velocity of the tyre and its radius are known. The length of the footprint area is then related to the flattening of the tyre, which is a critical parameter of the tyre in operation, particularly in tyres for heavy motor transport.

Patent application EP 689950 describes a different method for monitoring parameters of a tyre such as its pressure and temperature. In particular, a self-powered programmable electronic device positioned on the inner surface of a tyre or on its mounting rim is used. This device can be used to monitor and store the pressure, temperature and the number of rotations of the tyre, and may comprise an extensometer whose output signal measures the bending of the inner surface of the tread, or an accelerometer which measures the value of the acceleration which the tread undergoes. Additionally, the device is activated by an external radio-frequency signal and transmits an alarm signal if a predetermined limit of the measured values is exceeded.

There are also known methods for measuring deformations of the tread of a tyre during motion and for transmitting it to a receiver located on the vehicle.

Patent application WO 93.25400 describes a sensor, comprising a resonant circuit which oscillates at a predetermined characteristic frequency, located within the tread of a tyre, and is capable of transmitting a signal directly dependent on the aforesaid deformations. This resonant frequency is affected by the deformations of the tread during motion and the sensor transmits electromagnetic waves proportional to these variations of the resonant frequency. These electromagnetic waves are received by a processing unit connected to a receiver located inside the vehicle.

U.S. Pat. No. 5,247,831 describes a method for monitoring the behaviour of the footprint area of a tyre during the travel of the vehicle to optimize the driving of the vehicle. In particular, a piezoelectric sensor consisting of longitudinal strips of piezoresistive rubber is inserted into the tread. This sensor is capable of measuring the deformations of the tread, since the strips change their electrical resistance as a function of the said deformations.

There are also known methods and devices for acting on the driving and/or control system of the vehicle, particularly on the devices which control the suspension of the vehicle, to control its behaviour according to the information obtained from the axles of the vehicle or from the wheel hubs.

The publication "A method for the evaluation of the lateral stability of vehicles and tires" by the Società Pneumatici Pirelli S.p.A., presented at the International Automobile Tire Conference, Toronto, Canada, on 22 Oct. 1974, illustrated a method for determining the dynamic behaviour of the vehicle as a function of the forces developed by the various types of tyre sets and the various conditions of the road surface.

The publication principally cites three forces which determine the dynamic behaviour of a tyre, namely the vertical force, the longitudinal force and the lateral force.

The vertical force is that which is due to the dynamic load to which the tyre is subjected. The longitudinal force is that which is due to the moment applied to the axis of the tyre as a result of an acceleration or braking of the vehicle. The lateral force, also present in conditions of normal travel in rectilinear motion, is the resultant of the force due to the characteristic angles of the vehicle suspension (camber and toe-in) and to the ply-steer developed by the layers of inclined cords of the belt structure of the tyre, and of the thrust generated by the centrifugal force during drifting. The sum of the forces developed by the four tyres generates a resultant system applied to the centre of gravity of the vehicle, which balances the inertial forces and determines the attitude of the vehicle as a function of the characteristics of the suspension system of each axle. This resultant system is determined by means of suitable accelerometers, one positioned on the front axle and one on the rear axle of the vehicle. The article shows a set of graphs showing the centripetal acceleration or the centripetal force applied to the centre of gravity of the vehicle as a function of the angle of slip of the corresponding axle. From graphs plotted for different ground conditions and different types of tyres, it is possible to determine the behaviour of the vehicle provided with a predetermined set of tyres and to determine any lateral slipping of either the front or the rear axle in cornering.

SUMMARY OF THE INVENTION

The applicant has observed that the aforesaid known systems of controlling the behaviour of the vehicle is based on the system of forces measured at the hubs of the wheels, and the systems of measuring the deformations of the tyre are based on the determination of the deformations undergone by the tread in the footprint area of the tyre.

The applicant has observed that the values measured in these systems cannot be related in a biunique way to the conditions of travel of the tyre and, more precisely, to the system of forces developed by the tyre in each condition of travel.

The present invention is based on the applicant's perception that the determination of deformations of the tread, particularly in the footprint area of the tyre, does not make it possible to identify the system of forces developed by the tyre or the deformations of the tyre carcasswhich are associated with it and which represent the behaviour of the tyre. This behaviour is of considerable importance, especially during certain particular events, such as the braking or acceleration of the vehicle, drifting, and variations of load on the tyre.

According to the above, the present invention originated from the applicant's perception that the determination of the deformations of the tyre carcass, being related in a biunique way to the system of forces developed by the tyre in operation, makes it possible to determine the behaviour of the tyre in any of its conditions of motion.

It has been found that the measurements of the deformation of the carcassstructure of the tyre, at a given inflation pressure, according to a set of three Cartesian axes, in other words the deformation in the vertical direction, the deformation in the transverse direction and the deformation in the longitudinal direction, correspond in a biunique way, or in any case a reproducible way, to the vertical, lateral and longitudinal forces respectively which act on the tyre (or, in other words, to the forces which the tyre exchanges with the ground).

The applicant has previously described this technical solution and the determinations associated with it in patent application 99EP-114962.6, to which reference should be made for further and more detailed information, and which is to be understood as being integrally incorporated in this description.

The present invention relates more specifically to a particular method and a particular type of device for carrying out the aforesaid determinations.

In particular, the applicant has discovered a method for determining the deformations of a tyre in motion, which consists in measuring these characteristic values within the tyre by means of a moving station which sends a signal towards a point on the inner surface of the tyre, preferably when this point is within the footprint area of the tyre. This signal is reflected from the aforesaid surface and captured by the moving station which sends this reading to a fixed station located on board the vehicle on which the tyre is fitted. The characteristics of the reflected signal are proportional to the distance between the point of emission and the point of reflection.

The set of the determinations which are made measures the deformations of the tyre in the aforesaid characteristic directions, in other words the deformation in the vertical direction, the deformation in the transverse direction and the deformation in the longitudinal direction.

In a first aspect, the present invention relates to a system for monitoring the deformations of a moving tyre fitted on a rim associated with a vehicle, characterized in that it comprises:

a moving station located in a predetermined position on the said rim and capable of measuring in at least one direction the distance between the said predetermined position and the inner surface of the tyre, a fixed station located on the said vehicle and capable of receiving the said measurement from the said moving station.

Preferably, the said fixed station is capable of enabling the said measurement made by the said moving station.

In particular, the said moving station comprises at least one sensor capable of sending a signal within the tyre in a predetermined direction, and of receiving the reflected signal.

In particular, the said sensor comprises an electronic circuit board with which are associated an optical beam emitting device, a first lens, an optical beam receiving device, and a second lens.

In particular, the said fixed station comprises a supporting element, fixed at one of its ends to a hub on which the said rim is mounted, and an electronic circuit board fixed to the said supporting element.

In particular, the said electronic circuit board of the fixed station comprises an oscillator circuit which supplies a drive circuit for a first antenna, a radio-frequency receiver connected to the said first antenna, and an electrical demodulator device connected to the said radio-frequency receiver.

Preferably, the said fixed station is powered by the battery of the vehicle on which the tyre is fitted.

In particular, the said electronic circuit board of the sensor comprises a second antenna, connected to a power supply unit, which supplies a drive circuit for the said optical beam emitter and a drive circuit for the said optical beam receiver, and a circuit for reading the electrical signal emitted by the said optical beam receiver.

Preferably, the said optical beam emitter comprises an LED.

Preferably, the said optical beam receiver comprises a pair of p-i-n diodes.

In a second aspect, the present invention relates to a method for monitoring the deformations of a moving tyre fitted on a rim associated with a vehicle, characterized in that it comprises the following stages:

emitting a signal from a predetermined position on the said rim in at least one predetermined direction within the tyre, reflecting this signal from the inner surface of the tyre, receiving this reflected signal, processing the received signal in such a way as to generate a processed signal proportional to the distance of the point of reflection on the tyre from the said predetermined position in the said at least one predetermined direction.

In particular, the said stage of emitting a signal comprises:

enabling a moving station located on the said rim to emit the said signal when the said moving station passes through the footprint area of the tyre.

Preferably, the said method additionally comprises the stage of transferring the said signal processed by the said moving station to a fixed station located on the said vehicle.

Preferably, the said stage of enabling a moving station is carried out by the said fixed station.

Preferably, the said stage of enabling the moving station comprises the stage of supplying power to the moving station for a time interval during which the stage of transferring the processed signal from the said moving station to the said fixed station is also carried out.

In particular, the said stage of enabling a moving station comprises the stage of generating a magnetic field at the said fixed station in the direction of the said moving station and of supplying power by means of the said magnetic field to a drive circuit in the said moving station for an optical beam emitter.

Preferably, the said stage of transferring the said processed signal from the said moving station to the said fixed station comprises the stages of:

generating a magnetic field corresponding to the said processed signal at the said moving station in the direction of the said fixed station, converting the said magnetic field to an electrical signal, decoding the said electrical signal in such a way that the corresponding processed signal is obtained.

In a further aspect, the present invention relates to a wheel for vehicles, comprising a tyre fitted on a supporting rim, characterized in that it comprises a moving station located at a predetermined position on the said rim and capable of measuring in at least one direction the distance between the said predetermined position and the inner surface of the tyre, and capable of transmitting the said measurement to a vehicle on which the said wheel is fitted.

BRIEF DESCRIPTION OF THE DRAWINGS

Further characteristics and advantages of the present invention are explained in greater detail in the following description, with reference to the attached drawings, which are provided solely for explanatory purposes and without any restrictive intent, and which show.

DETAILED DESCRIPTION OF THE PREFERRED EMBODIMENTS

Figure 1:
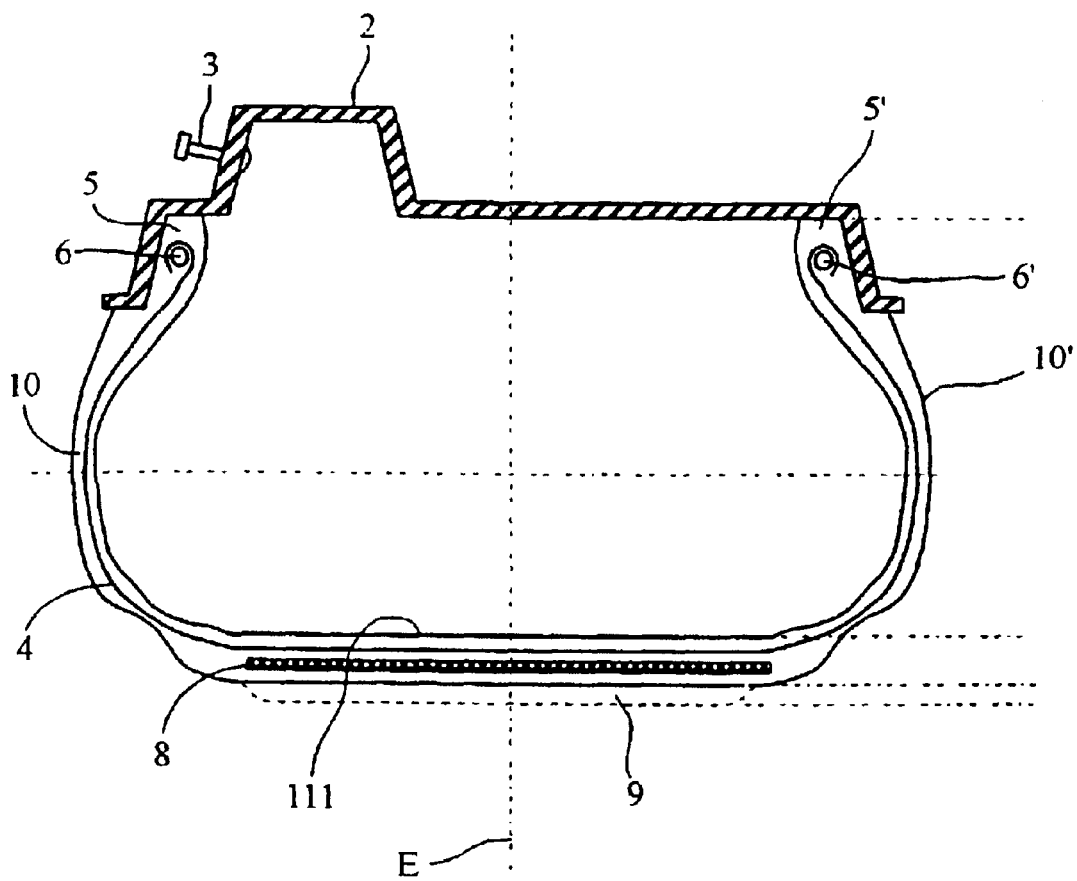
in FIG. 1, a cross section through a tyre fitted on its supporting rim under a static load.

FIG. 1 shows, by way of example, a wheel comprising a tyre 1, of the type conventionally called "tubeless", in other words without an inner tube, and a supporting rim 2. This tyre 1 is inflated by means of an inflation valve 3 located, for example, in a known way, on the channel of the said rim.

The tyre 1 consists of an internally hollow toroidal structure formed by a plurality of components, and primarily by a textile or metallic carcass, having two beads 5 and 5' each formed along an inner circumferential edge of the carcass for securing the tyre to the corresponding supporting rim 2. The said carcass comprises at least one pair of annular reinforcing cores, called bead wires 6 and 6', which are circumferentially inextensible and are inserted in the said beads (usually with at least one bead wire per bead).

The carcass comprises a supporting structure formed by a reinforcing ply 4 which includes textile or metallic cords, extending axially from one bead to the other according to a toroidal profile, and which has each of its ends associated with a corresponding bead wire.

In tyres of the type known as "radial", the aforesaid cords lie essentially in planes containing the axis of rotation of the tyre.

On the crown of this carcass there is placed an annular structure 8, known as the belt structure, normally consisting of one or more strips of rubberized fabric, wound on top of each other to form what is called a "belt package", and a tread 9 made from elastomeric material, wound around the belt package, and stamped with a relief pattern for the rolling contact of the tyre with the road. Two sidewalls 10 and 10', made from elastomeric material, each extending outwards in the radial direction from the outer edge of the corresponding bead, are also placed on the carcass, in lateral axially opposed positions.

In tyres of the type known as "tubeless", the inner surface of the carcass is normally covered with what is called a "liner" 111, in other words one or more layers of airtight elastomeric material. Finally, the carcass may comprise other known elements, such as edges, strips and fillers, according to the specific design of the tyre.

The combination of all these elements determines the mechanical characteristics of elasticity, rigidity and resistance to deformation of the tyre, which constitute the connection between the system of forces applied to the tyre and the extent of the corresponding deformations which it undergoes.

Figure 2:
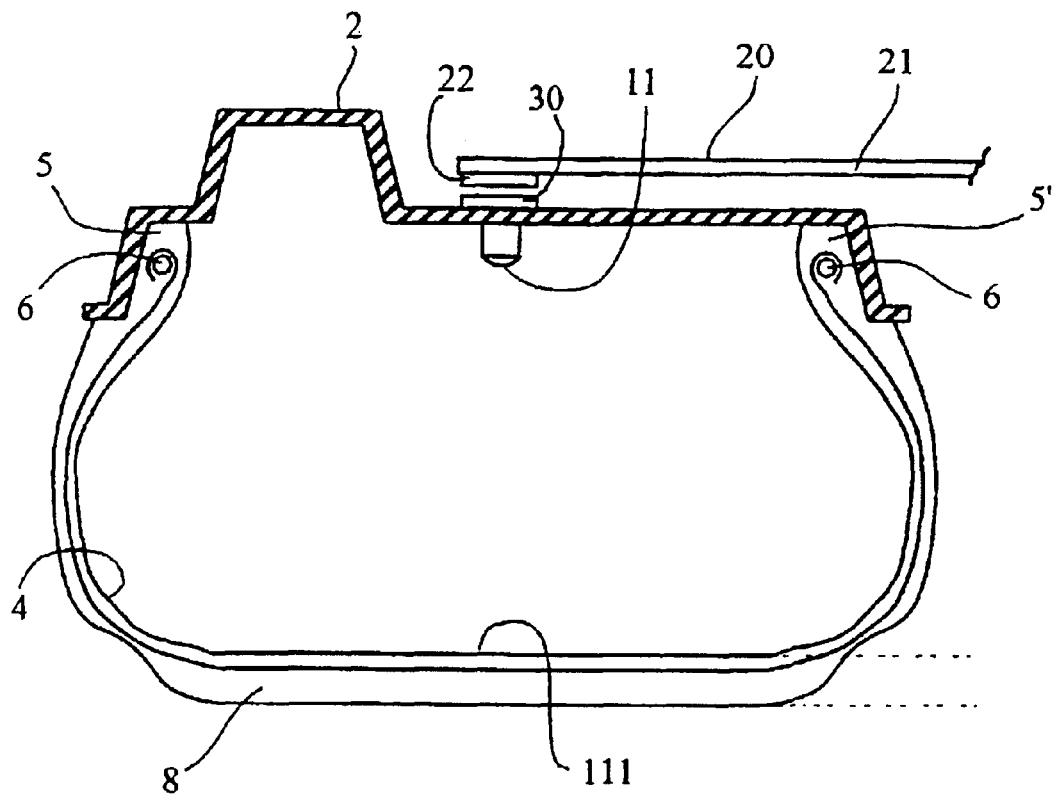
in FIG. 2, a detail of a pneumatic wheel showing the system for determining the deformations of the tyre according to the present invention, comprising a moving station and a fixed station.

FIG. 2 shows, in a preferred embodiment of the invention, a system for monitoring the profile of the tyre of FIG. 1, fitted on the supporting rim 2 and associated with a vehicle; the system comprises a moving station 30, fitted in the wall of the supporting rim 2 and including a sensor/emitter 11 (called a "sensor" below for the sake of brevity), located within the cavity formed between the tyre and the rim, preferably along the mid-line plane of the said rim.

This moving station 30 comprises a transmitter which sends the determinations made to a fixed station 20, located on the said vehicle and provided with a suitable receiver.

The fixed station is preferably associated with the corresponding hub of the vehicle by means of suitable supports which are described below.

The moving station and the fixed station communicate with each other in any convenient way, for example by magnetic coupling between the two stations or by means of radio waves, preferably at high frequency.

Figure 3:
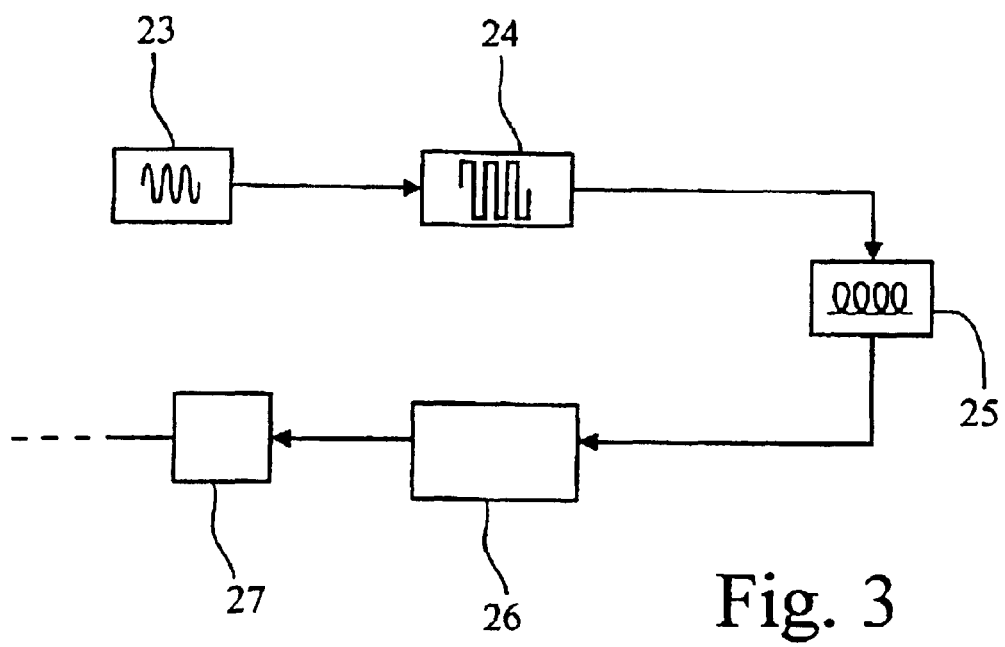
in FIG. 3, a block diagram of the electronic circuit present within the fixed station shown in FIG. 2.

In a preferred embodiment, the fixed station 20 comprises a supporting element 21, fixed at one of its ends to the hub of a wheel, and an electronic circuit board 22, placed preferably at the opposite end of the said supporting element, a block diagram of this circuit board being provided in FIG. 3.

In particular, the said electronic circuit board comprises an oscillator circuit 23, which supplies a drive circuit 24 for a first antenna 25, referred to below as the fixed antenna. The said circuit board also comprises a radio-frequency receiver 26 connected to the said antenna and an electrical demodulator device 27. The electrical power required to supply the said station can be provided directly by the vehicle battery through a suitable drive circuit (not shown).

Figure 13:
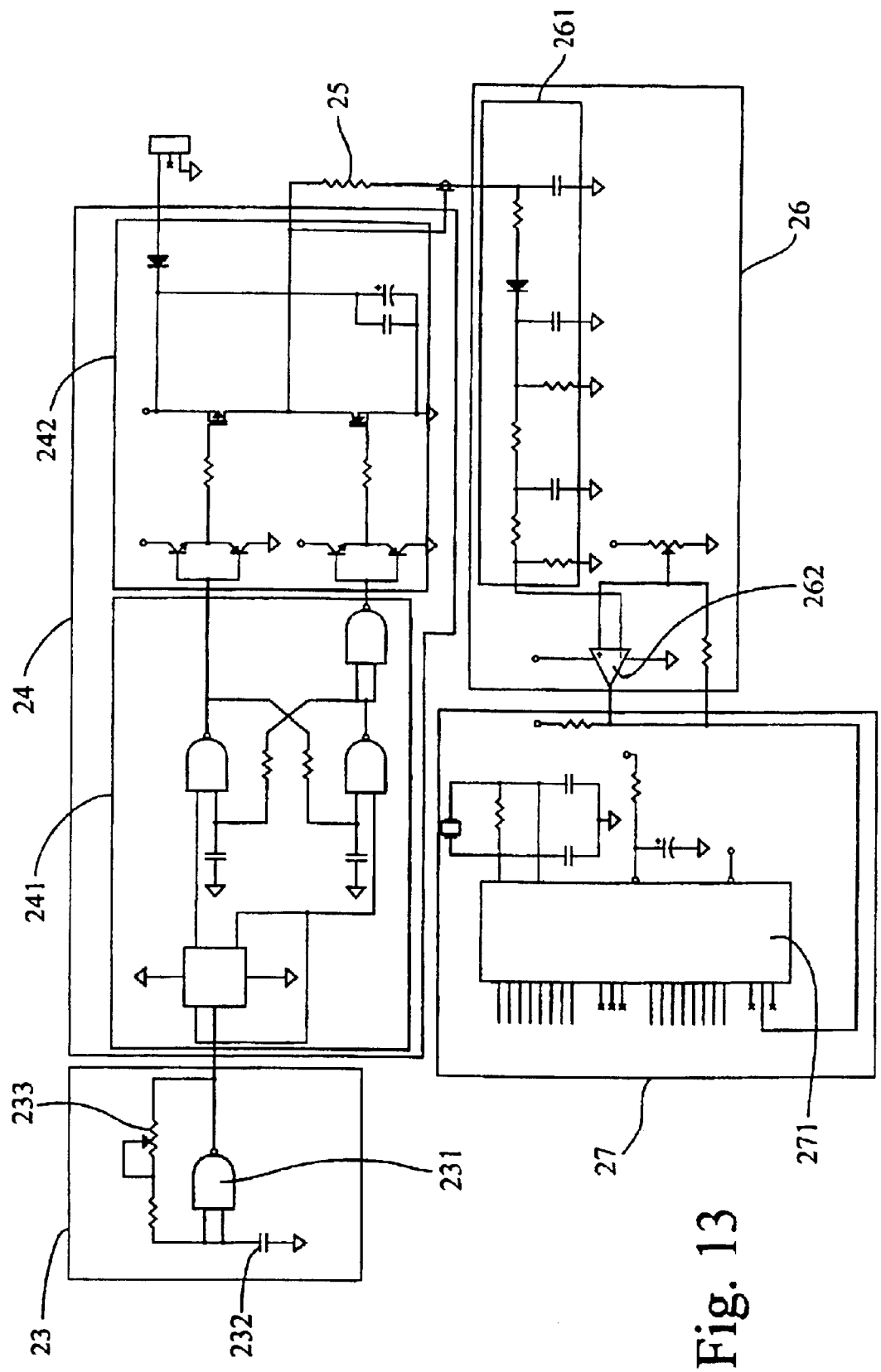
in FIG. 13, an example of a circuit diagram of the electronic circuit present within the fixed station.

FIG. 13 shows an example of a circuit diagram of the electronic circuit board of the fixed station 20. In particular, the oscillator 23, comprising a logic gate 231 and an oscillation frequency control consisting of a capacitor 232 and a variable resistor 233, is shown; the drive circuit 24 of the antenna 25 comprising a squaring circuit 241 consisting of flip-flops and a MOSFET amplifier 242 for the squared signal. The circuit also comprises the radio-frequency receiver 26 of the antenna signal, comprising a plurality of capacitance filters 261 and a differential amplifier 262, and the electrical demodulator device 27 comprising a suitable integrated component 271.

A person skilled in the art will note that this electrical circuit, shown in the block diagram in FIG. 3, can be constructed in any other equivalent way, within the scope of the present invention, for example by changing the components from those shown in the diagram in FIG. 13.

Figure 4:
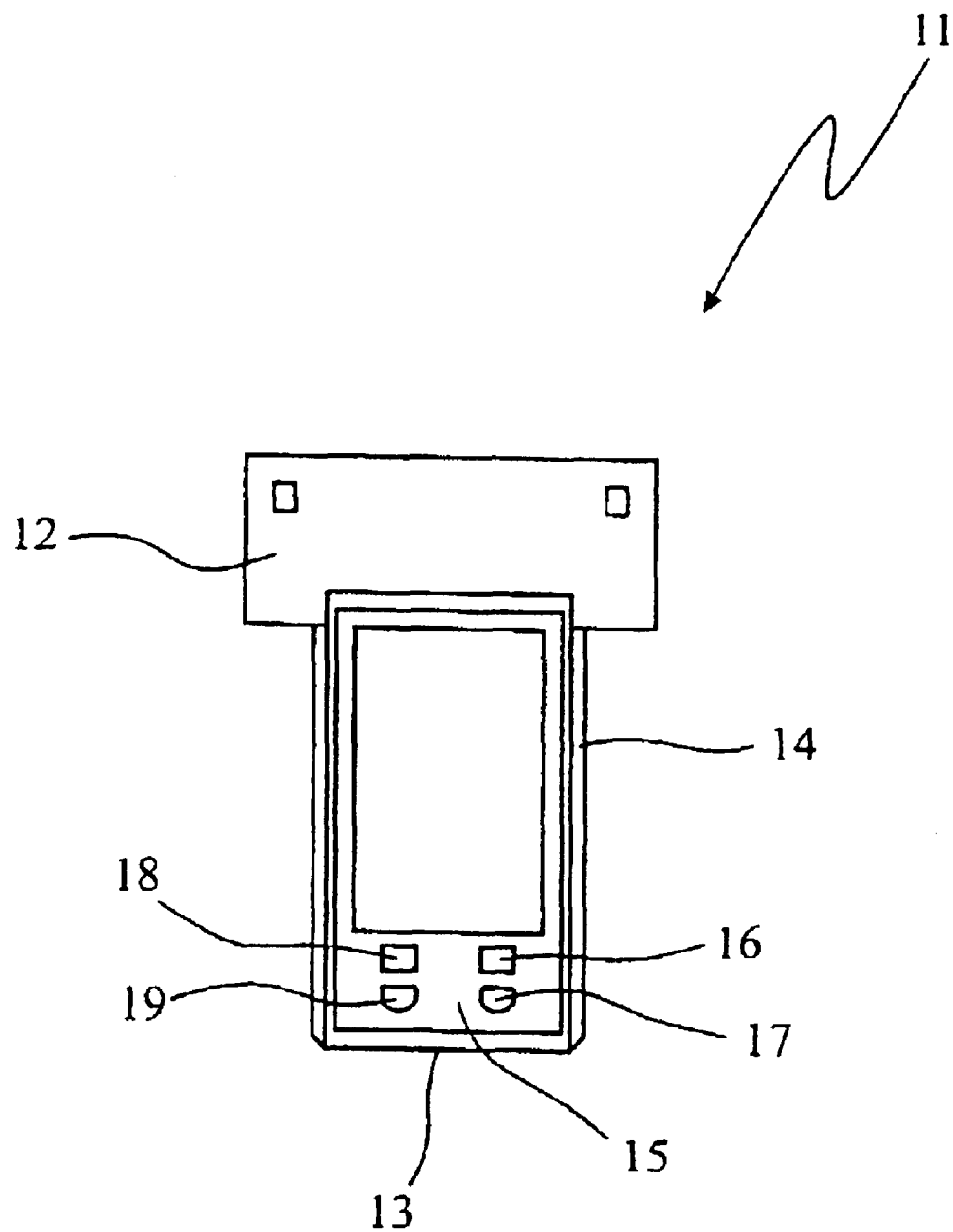
in FIG. 4, the moving station in detail, showing its electrical and optical component parts.

In a preferred embodiment, the moving station 30 shown in FIG. 4 essentially consists of the sensor 11, comprising a hollow support 12, preferably made from plastic material, into which an externally threaded tube 13 is inserted, preferably by screwing. The external thread 14 of the tube 13 is used both for inserting the tube into the support and for fixing the whole station within the wall of the supporting rim 2 of the wheel. Alternatively, the wall of the support can be threaded both externally, for fixing the station into the wall of the rim, and internally, for enabling the tube 13 to be fitted. The main function of the support 12 is to form an airtight plug for sealing the hole formed in the body of the rim 2.

An electronic circuit board 15, with which are associated an optical beam emitting device 16, a first lens 17, an optical beam receiving device 18, and a second lens 19, is inserted into the tube 13.

Figure 5:
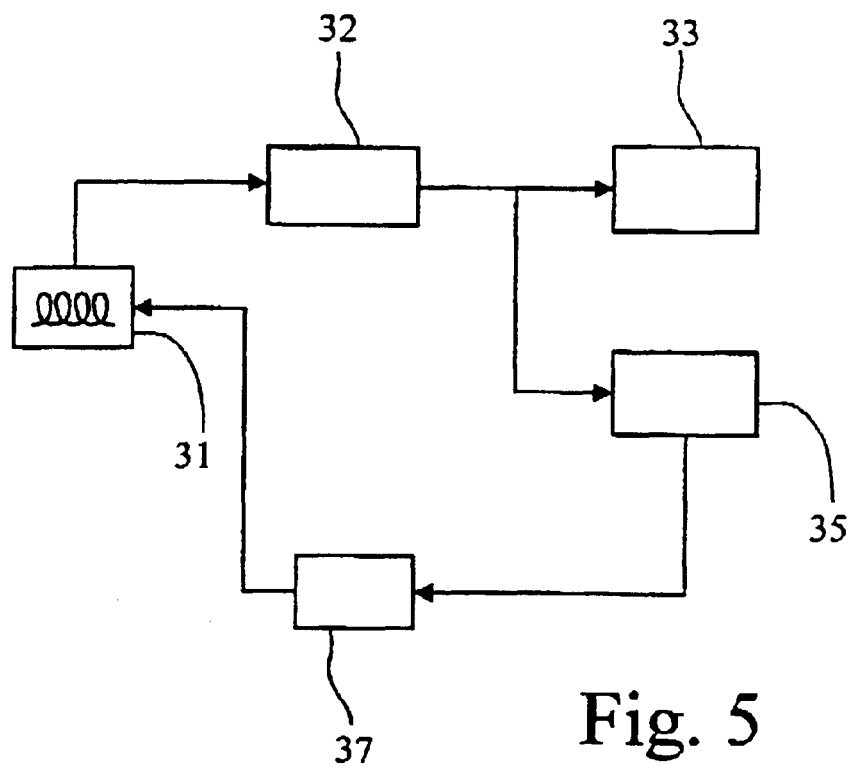
in FIG. 5, a block diagram of the electronic circuit present within the moving station shown in FIG. 4.

The electronic circuit board 15, the block diagram of which is shown in FIG. 5, also comprises a second antenna 31, called the "moving antenna" below, connected to a power supply unit 32, which supplies the electrical power to the optical beam emitting device 16 and to the optical beam receiving device 18. For this purpose, the moving station comprises a drive circuit 33 for the said emitter 16 and a drive circuit 35 for the said receiver 18. This electronic circuit board also comprises a circuit 37 for reading the signal received by the said receiver 18, the output of this circuit being connected to the said moving antenna 31.

Preferably, the optical beam emitting device 16 is an LED 34 which emits an optical beam of infrared light.

Preferably, the optical beam receiving device 18 is formed by a pair of p-i-n diodes P1 and P2 adjacent to each other.

Figure 14:
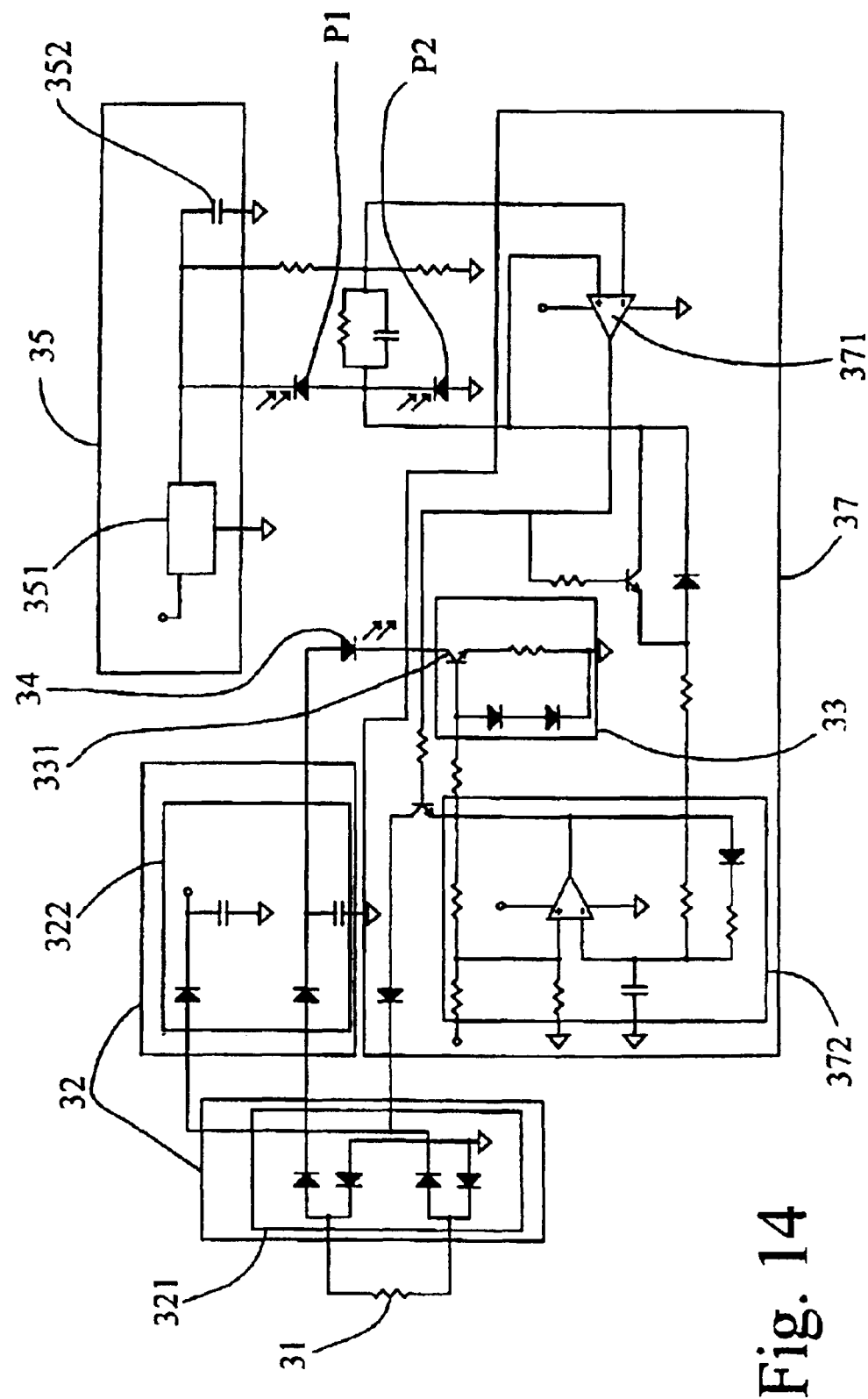
in FIG. 14, an example of a circuit diagram of the electronic circuit present within the moving station.

FIG. 14 shows an example of a circuit diagram of the electronic circuit board 15 of the moving station 30. In particular, it shows the power supply 32, comprising a diode bridge 321 and a stabilizer circuit 322, the drive circuit 33 for the said LED 34, comprising a transistor amplifier 331, and the drive circuit 35 for the said p-i-n diodes P1 and P2, comprising an integrated stabilizer 351 and a load capacitor 352. The diagram also comprises the, circuit 37 for reading the signal received by the p-i-n diodes, comprising a differential amplifier 371, an oscillator 372, and a transistor amplifier 373 for amplifying the signal received by the differential amplifier 371 and for sending it to the antenna 31.

In this case also, a person skilled in the art will note that this electrical circuit, as defined by the block diagram in FIG. 5, can be constructed in any other equivalent way, within the scope of the present invention, for example by changing the components from those shown in the diagram in FIG. 14.

Figure 6:
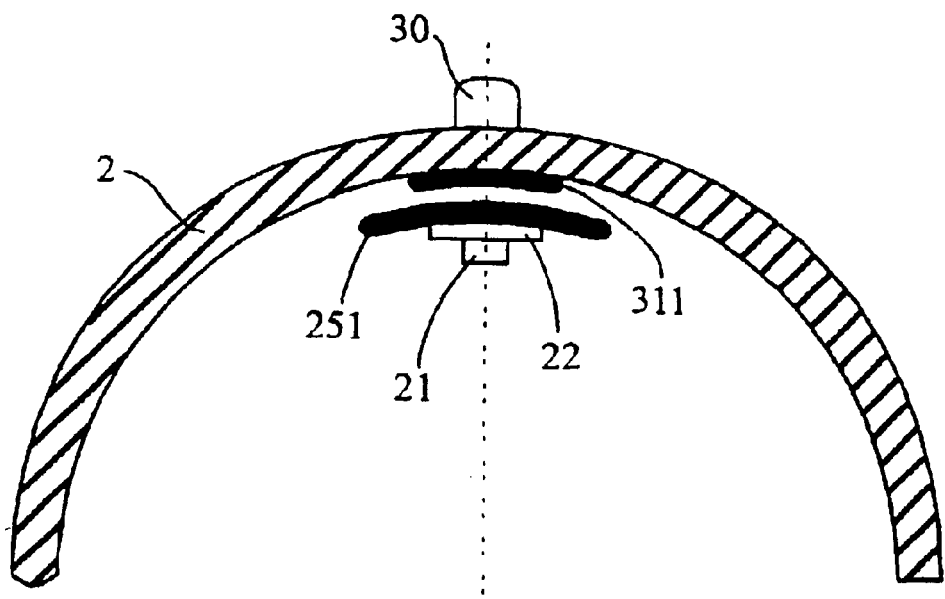
in FIG. 6, a detail of the wheel according to the present invention, showing in particular the area of coupling between the antenna located on the fixed station and the antenna located in the moving station.

In the preferred example of embodiment described above, the communication between the said moving station and the said fixed station is provided by means of magnetic coupling: in other words, the fixed antenna 25 and the moving antenna 31 preferably each comprise an inductive circuit, and the signal exchanged between the two antennae is a magnetic signal. In particular, with reference to FIG. 6, the fixed antenna 25 comprises a fixed coil 251, supplied with an alternating radio-frequency current generated by the drive circuit 24, and the moving antenna 31 comprises a moving coil 311 which is integral with the rim 2 of the wheel.

With each rotation of the pneumatic wheel, the moving coil 311 is brought to a position facing the fixed coil 251, thus intercepting the magnetic field generated by the aforesaid coil. A corresponding electrical voltage is induced in the moving coil 311 and supplies the energy required for the operation of the moving station as a whole.

In an original way, according to the invention, the moving station carries out at least one of the specified determination in the tyre within the time interval during which the moving coil and the fixed coil are facing each other, and sends, by means of the moving coil, a signal corresponding to the measurement which has been made. A voltage corresponding to the measurement made is induced in the fixed coil, as will be explained in greater detail below.

More precisely, the pair of antennae produce the transfer, between the fixed station and the moving station, of the electrical power required to supply the moving station, and also the transfer, between the fixed station and the moving station, of the data on the measurements made in the tyre. In particular, the information is transmitted in the form of a signal modulating the alternating power supply voltage of the fixed coil.

Alternatively, the moving station can be supplied by a battery, in which case, preferably, the moving station also comprises an accelerometer or other equivalent device which switches off the station when the vehicle is stopped for a time exceeding a predetermined value, in order to economize on battery life.

Clearly, many other equivalent systems can also be used for the transfer of the information.

In the embodiment described above, as has been said, the sensor comprises both the signal emitting device and the element receiving the reflected signal. It should be understood that the two functions can be carried out by two independent elements which are separate from each other, or by a single element which combines them both, according to the specific technology used.

The signal emitted by the sensor 11 can be selected from a wide range of types of usable signals: preferably, those in the form of sound waves are used, for example ultrasounds, or electromagnetic waves, which are reflected from the inner surface of the tyre. The reflection produced by the inner surface of the tyre is particularly convenient, since it does not necessitate modifications to the structure of the tyre or to its manufacturing process, as it does not require additional reflecting elements or elements formed in the aforesaid surface.

The monitoring system described by way of example above operates in the following way.

Within the fixed station 20, the coil 251 is supplied continuously with an electrical current generated by the oscillator 23 and made sinusoidal by the drive circuit 24, in such a way as to generate a magnetic field.

The moving coil 311 located in the moving station 30 intercepts this magnetic field whenever the coil passes, during the rotation of the wheel, across the fixed coil. The interception of the magnetic field induces a current in the moving coil. This current has the same sinusoidal form as the power supply current of the fixed coil and is sent to the power supply device 32. This device preferably comprises, in a known way, a bridge of diodes or equivalent devices capable of converting a sinusoidal current to a continuous current. The current produced in this way supplies the optical beam emitting device and the optical beam receiving device. In particular, this current supplies the drive device 33 of the LED and the drive device 35 of the pair of p-i-n diodes.

Figure 7A:
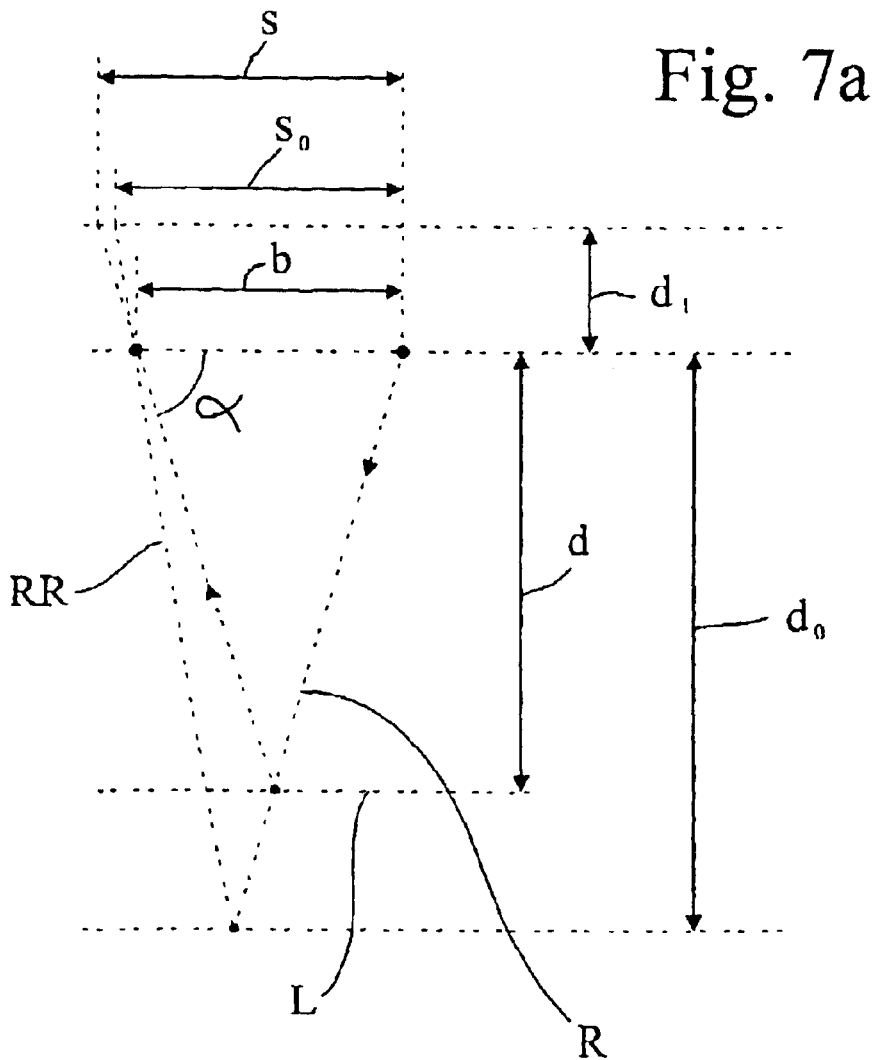
in FIGS. 7*a–b*, an operational diagram of the optical measurement system used by the moving station according to the invention.
Figure 7B:
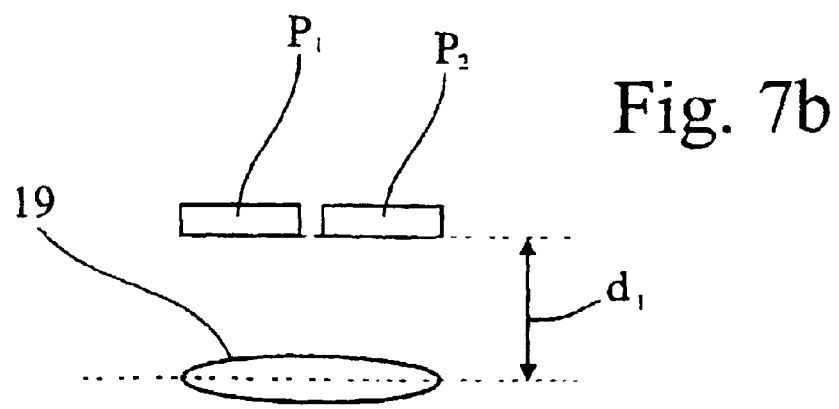

With reference to the diagram in FIGS. 7a and 7b, the optical beam emitting device (LED) emits an optical beam R collimated by the first lens 17, directed towards a predetermined point of the surface of the liner, preferably selected within the footprint area of the tyre. The ray RR reflected from the surface L of the tyre liner reaches the optical beam receiving device 18 (the pair of p-i-n diodes) at an angle of α dependent on the distance d of the surface of the liner from the emission point.

The optical beam receiving device comprises the second lens 19 and the pair of adjacent p-i-n diodes P1 and P2, as shown in FIG. 7b. The optical beam collimated by the lens 19 is focused on these diodes. As the distance d between the surface of the liner and the lens 19 varies, the angle of the reflected ray RR changes and the surface area of the diodes struck by the optical beam changes as a result. In particular, there is a change in the ratio of the quantity of light incident on one diode to that incident on the other. This ratio is therefore proportional to the distance between the lens and the surface which produces the reflection, in this case the surface of the liner.

In particular, in FIG. 7a, s represents the distance between the position (L) of the emitting device (LED) and the point (F) of arrival of the reflected beam RR on the surface of the p-i-n diodes, b represents the distance between the emitting device and the position of the lens 19, and $d_1$ represents the distance between the pair of p-i-n diodes and the lens 19. Assuming that the distance $d-d_0 \ll d$, in other words that the variation of the distance d is very small with respect to the initial value of the distance d, the following relation is true:

$$d-d_0=(s-s_0)*d/b*d/d_1 \qquad (1)$$

and therefore:

$$s-s_0=(d-d_0)/d*d_1/d*b \qquad (2)$$

Each of the p-i-n diodes generates an electrical signal, the difference between which is proportional to the distance $s-s_0$ and therefore to the variation of the distance d.

The device 37 for reading the electrical signal generated by the p-i-n diodes determines this difference, and sends a corresponding electrical signal via the antenna 31 to the fixed station. This signal transmission takes place because, in practice, the signal corresponding to the aforesaid difference carries out an amplitude modulation of the sinusoidal current induced in the moving coil. This amplitude modulation creates a variation of magnetic field which is detected by the fixed coil by means of the radio-frequency receiver 26. A signal corresponding to the aforesaid amplitude modulation is extracted from this coil by means of the demodulator 27 and is sent to the vehicle for the specified purposes.

Now that the system of monitoring is known in a preferred embodiment of its more general aspect, the method according to the invention for recognizing the behaviour of a tyre in operation will be more clearly evident.

Figure 8:
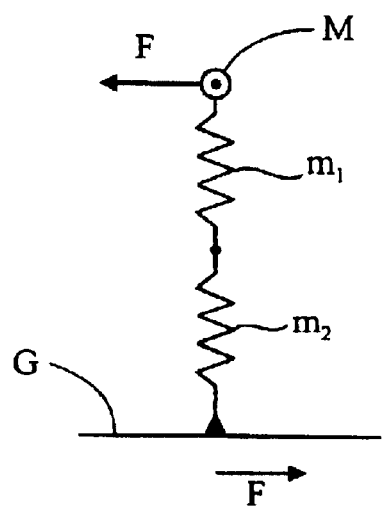
in FIG. 8, a schematic representation of a pneumatic wheel.

FIG. 8 is a schematic representation of the structure of a pneumatic wheel with two springs m1 and m2 mounted in series between the hub M of the vehicle and the surface G of the ground.

The spring m1 represents the carcass structure of the tyre, while the spring m2 represents the structure of the tread, which has a specific elasticity dependent on the visco-elastic characteristics of the mixture and on the geometrical characteristics of the tread design.

The force F applied to the footprint area of the tyre is balanced by an equal and opposite force F applied to the hub of the wheel. Unless the behaviour of m1 (m2) is known, it is not possible to know the value of the deformation caused by the force acting on m1 (m2), and vice versa.

The forces transmitted by the tyre to the ground in a given situation, static or dynamic, are associated with the deformations of the tyre, in other words with the deviations of the profile of the carcass in operation from the simple inflation profile of the carcass.

The profile of the carcass in operation is also defined here by the term "deformed state of the carcass", while the simple inflation profile of the carcass, in other words that of the carcass in the tyre fitted on the rim on which it is used and inflated to its nominal operating pressure, in the absence of a load, is defined here, albeit incorrectly, as the equilibrium profile.

For the purposes of the present invention, the carcass profile is defined as the profile according to the neutral axis of the carcass plies in the cross section of the tyre. In particular, the carcass profile describes the deformed state of the said tyre under the effect of the system of forces acting on it.

It is not possible to deduce the deformed state of the carcass in a unique way from measurements made on the footprint area. Similarly, it is not possible to find the deformation of the footprint area in a unique way from the deformed state of the carcass, since the deformation depends on parameters which are frequently unknown, particularly the value of the coefficient of friction between the tyre and the ground.

The applicant has perceived that the deformed carcass profile, at a given inflation pressure, itself yields a description of the actual behaviour of the tyre in motion. Other significant parameters for the interpretation of the measurements of the deformations of the tyre are the value of the inflation pressure of the tyre, the temperature of the fluid within the tyre, and its velocity or acceleration.

The deformations of the carcass profile considered for the purposes of the present invention are defined as follows:

flattening ($X_1$): the deformation directed along a vertical axis or in any case along an axis perpendicular to the road surface;

lateral displacement, or skidding, or drift ($X_2$): the deformation directed along the axis of rotation of the tyre;

longitudinal creep or torsion ($X_3$): the deformation directed along the circumferential direction, in other words the direction of rolling of the tyre.

A more detailed description of the relations present between the said values and the behaviour of a tyre is given in the aforesaid patent application 99EP-114962.6 in the name of the present applicant.

The measurement of these deformations is expressed as a variation of $X_1$, $X_2$, $X_3$ with respect to corresponding values determined on the equilibrium profile of the tyre at a specific inflation pressure.

Figure 9:
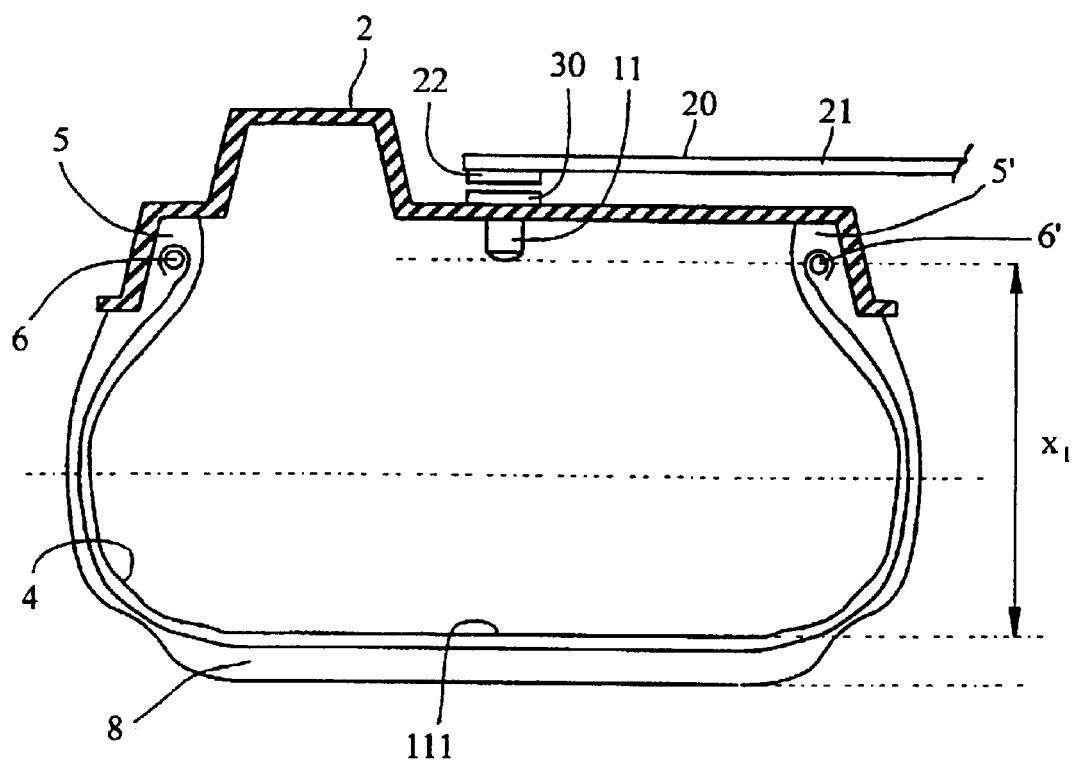
in FIG. 9, a cross section through a tyre fitted on its supporting rim, showing a system according to the invention for monitoring the deformation in the vertical direction (in other words the direction of flattening)
Figure 10:
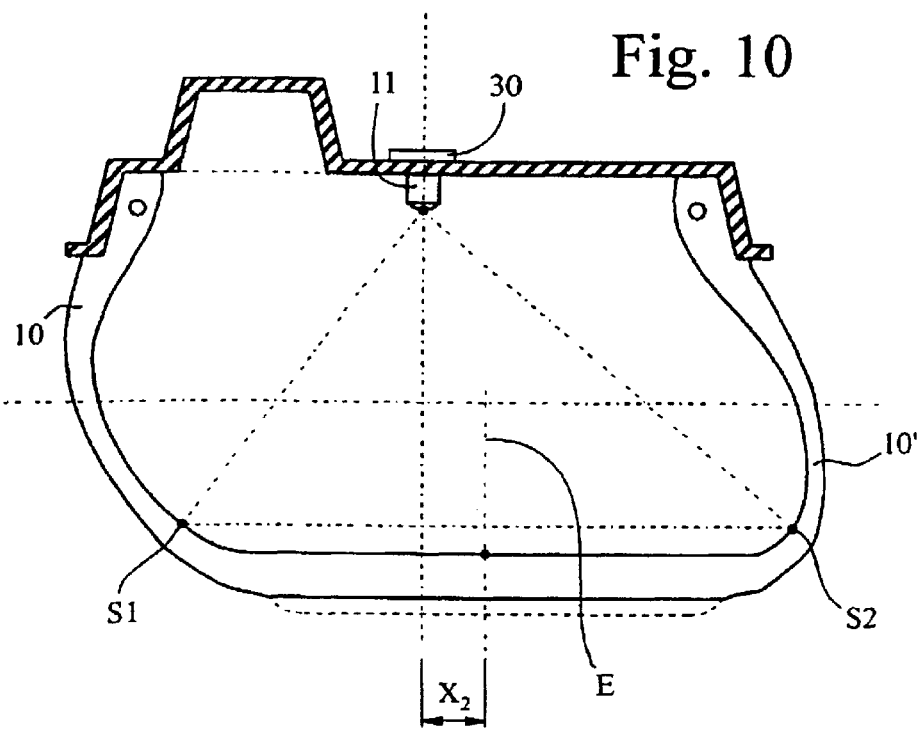
in FIG. 10, a longitudinal section through a tyre fitted on its supporting rim in conditions of lateral drift, showing a system according to the invention for monitoring the deformation in the lateral direction (in other words the direction of lateral displacement)
Figure 11:
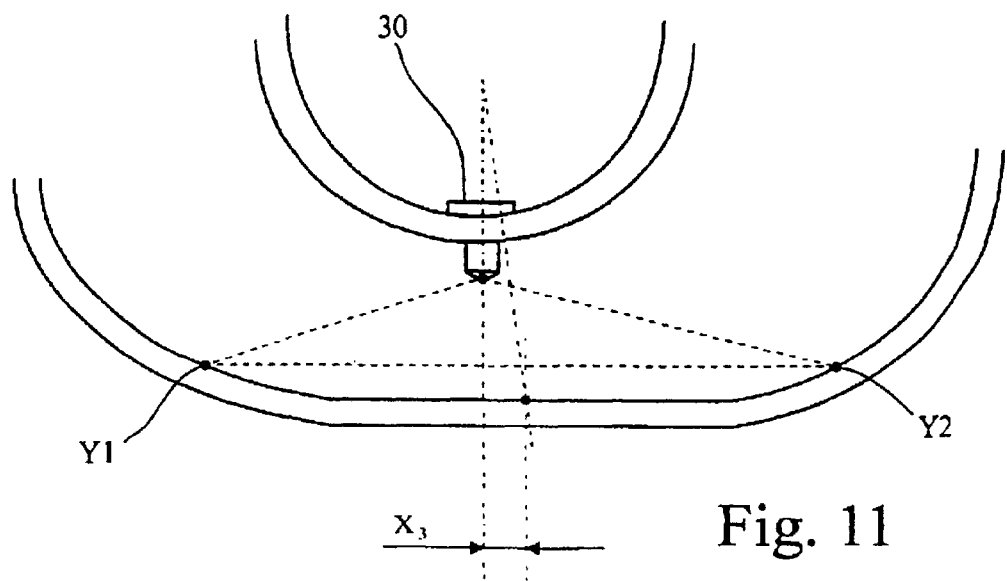
in FIG. 11, a longitudinal section through a tyre fitted on its supporting rim in conditions of braking, showing a system according to the invention for monitoring the deformations in the longitudinal direction (in other words the direction of longitudinal displacement)

The inner surface of the tyre, particularly the component called the "liner", interacts with the sensor 11 in the determination of $X_1$, $X_2$, and $X_3$ as shown in FIGS. 9, 10, and 11.

In FIG. 9, the distance $X_1$ corresponds to the distance between the surface of the liner 111 and the sensor 11 in the direction of the radius of rolling of the tyre.

In FIG. 10, the distance $X_2$ corresponds to the displacement in the transverse direction of the point of projection of the sensor 11 on the surface of the liner 111 with respect to the point of intersection of the surface of the liner with the equatorial plane E.

In FIG. 11, the distance $X_3$ corresponds to the displacement in the circumferential direction of the point of projection of the sensor 11 on the surface of the liner 111, along the equatorial plane, with respect to the point of the surface of the liner in the centre of the footprint area.

For the purpose of measuring these distances, the sensor 11 emits a signal which is reflected from the liner with an intensity which differs according to its position with respect to the sensor. The reflection time of the signal can be measured in combination with the measurement of the intensity, or as an alternative to it. The reflected signal received by the sensor is suitably encoded according to the angle of reflection and/or the differences of intensity and/or reflection time from predetermined values, in such a way as to determine the value of $X_1$, $X_2$ and $X_3$.

Advantageously, the reflected signals can be encoded in the sensor itself. For example, the sensor can emit two optical beams, each directed towards a predetermined point on the surface of the liner.

In FIG. 10, a first optical beam is directed towards a point $S_1$ on the sidewall 10 of the tyre, and a second optical beam is directed towards a point $S_2$ of the opposite sidewall 10'. The optical beams are orientated in such a way that the points $S_1$ and $S_2$ are on the same horizontal plane. Each of the two measured distances represents the distance of the sensor 11 from the corresponding sidewall in the direction of the optical beam which is emitted. $X_2$ can be calculated by comparing the measurements of these two distances with each other, if the angles of emission of the optical beams are known.

Figure 12:
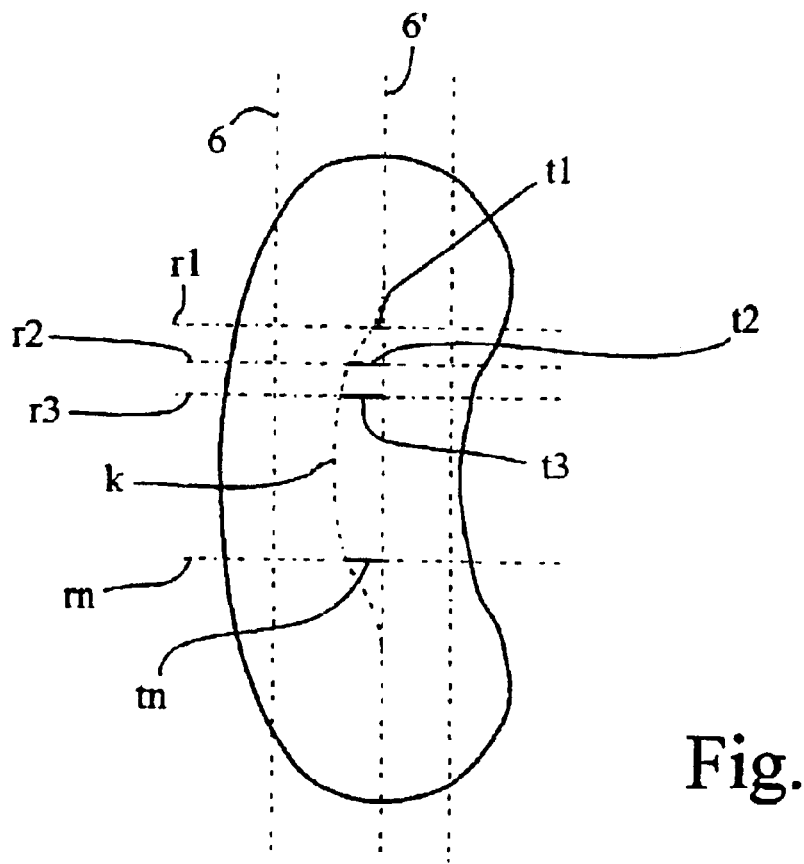
in FIG. 12, the footprint area of the tyre, modified to a bean shape, during drifting, with the paths of the bead wires, the mid-line of the tread and a set of radial planes, showing for each of these the corresponding value of deformation.

FIG. 12, which illustrates the bean-shaped deformation of the footprint area of the tyre during drifting, depicting the paths of the bead wires 6, 6' and the mid-line k of the tread, shows how $X_2$ varies with the position, with respect to the said area, of the cross section (radial planes $r_1$, $r_2$, $r_3$, $r_4$) on which the determination is carried out, moving from the value $t_1$ to $t_2$, then to $t_3$ and finally to $t_n$, along the longitudinal extension of the footprint area. This variation can be measured by a series of successive determinations which are distributed over a period of time or distributed circumferentially along the said longitudinal extension.

In FIG. 11, a first optical beam is directed towards a point $Y_1$ on the surface of the liner on the equatorial plane of the tyre. This point $Y_1$ is close to the start of the footprint area in the direction of advance of the tyre. A second optical beam is directed towards a point $Y_2$ on the surface of the liner on the equatorial plane of the tyre. This point is close to the exit from the footprint area, in other words in the direction opposite the direction of advance of the tyre. Additionally, the optical beams are orientated in such a way that the points $Y_1$ and $Y_2$ are on the same horizontal plane.

Each of the two measured distances represents the distance of the sensor 11 from the corresponding point $Y_1$ or $Y_2$ in the direction of the emitted optical beam.

$X_3$ can be calculated by comparing the measurements of these two distances with each other, if the angles of emission of the optical beams are known.

Alternatively, instead of measuring the distance between two points, the sensor may carry out an integration of different determinations between adjacent points, thus reconstructing the shape of an extended portion of the inner surface of the tyre.

It should be understood that the sensor and the reflecting element described above can be replaced with equivalent effect, within the scope of the present invention, with other types of sensors and reflecting elements capable of determining the aforesaid parameters by the reflection of a signal within the tyre.

Alternatively, it is possible to mount a plurality of sensors on the rim, these sensors being preferably located in positions equidistant from each other, in such a way as to maintain a uniform distribution of the masses in the wheel, and each sensor being capable of measuring only one characteristic distance. Moreover, the number of the sensors may be such as to permit the determination of each characteristic value more than once during a complete rotation of the wheel. Preferably, the number of fixed coils located on the hub is equal to the number of sensors located on the rim.

Alternatively, a single sensor may be capable of measuring $X_1$, $X_2$ and $X_3$ simultaneously and sending, for example, a signal consisting of a first amplitude modulation for $X_1$ in a first time interval, a second amplitude modulation for $X_2$ in a second time interval, and a third amplitude modulation for $X_3$ in a third time interval. The set of three time intervals lies within the time interval used for the measurement.

The system of monitoring the deformed profile of the tyre preferably also comprises a pressure measuring device and/or a velocity and/or acceleration measuring device.

Alternatively, the moving station can be self-powered, using batteries located within it, a suitable timer enabling the measurement of the characteristic distances, preferably at the moment of the passage of the sensor under the footprint area of the tyre.

In a different embodiment, communication between the moving station and the fixed station is provided by means of radio waves, by including a suitable transmitter in the moving station and a suitable receiver in the fixed station.

The moving station is advantageously associated with the rim of the tyre, which forms an essential component for the determination of the deformations of the tyre. It should be noted that the rim has normally been used only as the support for mounting devices capable of determining the pressure and/or temperature within the tyre, and has not had any significance in relation to the determination of the deformations of the tyre, and of the tread in particular. In the system of determining the deformations according to the invention, the rim becomes the reference element, being the zero point, or in other words the centre of the system of Cartesian axes in which the dimensional variations of the tyre are measured in the three directions. The choice of the rim as the reference base is particularly advantageous because the rim is a rigid component of the pneumatic wheel, and is therefore essentially free of dimensional variations in its structure during the rotation of the tyre. In other words, the rigidity of the rim is the characteristic which allows it to be chosen as the fixed reference point on which the measurements made are based. Additionally, the surface of the rim permits easy access to the inner cavity of the tyre, thus facilitating the determination of the deformations within the tyre.

Example of Measurement

The method of determining a specific value in a tyre produced by the present applicant is described, purely by way of example, with reference to FIGS. 7a and 7b. In particular, the value to be measured is the flattening $X_1$, corresponding to the distance d in FIG. 7a, in a tyre of the 195/65R15 type, speed class V, in other words up to 240 km/hr, inflated to a pressure of 2.2 bars.

The distance d to be measured is of the order of 60 mm, the distance b is approximately 15 mm and the distance $d_1$ is approximately 9 mm.

For each millimetre of variation of the distance d, in other words of the flattening $X_1$, a value $s-s_0$ of approximately 40 $\mu$m is found. This value determines the sensitivity to displacement which the pair of diodes must have in order to determine variations of the distance d of the order of a millimetre.

The power supply to the fixed station is provided by the vehicle battery, at a voltage of 12 volts in particular, and the frequency of the power supply signal to the fixed coil is chosen to be approximately 1 MHz.

The maximum rotation velocity of the tyre may be 2500 r.p.m., and the measurement is to be made at this velocity. A fixed coil with a diameter of approximately 10 cm and a moving coil with a diameter of approximately 2 cm are chosen, with a gap of approximately 7 mm between the two coils. With a fixed coil of elliptical shape, the arc along which the two coils are completely facing each other is approximately 12 cm long. At a velocity of 2500 r.p.m., the useful measurement interval, in other words that in which the moving coil is acted on by the magnetic field generated by the fixed coil, is approximately 720 $\mu$s.

The power supply circuit 32 of the moving station 30 is designed in such a way that there is a charge time of not more than 100 $\mu$s. In the next 200 $\mu$s, the LED, being correctly powered, emits an optical beam of infrared light.

In the next 100 $\mu$s, the optical beam emitted by the LED is reflected from the surface of the tyre and captured by the pair of p-i-n diodes, after which the reading circuit 37 reads the determination received from the said pair of diodes.

The total darkness present in the cavity of the tyre facilitates the reflection of the optical beam and its reception by the p-i-n diodes. The quantity of light which is reflected from the surface of the tyre is approximately 10% of the quantity of light emitted by the LED; the quantity of light received by the pair of p-i-n diodes is approximately 10% of the quantity of light reflected from the surface of the tyre. The emission power of the LED is approximately 1.5 mW, and therefore the total optical power received by the p-i-n diodes is approximately 1.5 $\mu$W. The sensitivity of the p-i-n diodes used is approximately 0.5 A/W, and therefore the current generated by the said diodes is approximately 0.75 $\mu$A.

The quantity of light emitted by the LED can conveniently be controlled by varying the power of the supply circuit 32, in such a way as to enable the p-i-n diodes to receive an optimal quantity of light.

During the final 200 $\mu$s of the time period used for making the measurement, the signal emitted by the reading circuit is transmitted to the fixed station by means of the antenna, and separated from the carrier wave in the fixed station by means of the demodulator 27.

Preferably, a computer installed on board the vehicle interprets the received signal, makes it available to the user in an understandable language, activates any information or alarm devices, and uses it to activate any automatic devices for controlling the attitude of the vehicle.

Finally, the attention of the skilled person is drawn to the fact that the moving station, in the described embodiment, takes the form of a cylinder with a height of several centimetres. Since this cylinder projects radially from the surface of the rim towards the interior of the wheel cavity, it forms an element interfering with the beads of the tyre during the stage of fitting the said tyre on the rim. In other words, the moving stations do not allow the beads to slide axially along the surface of the rim until they reach the corresponding bead seats and bear on the flanges of the rim.

The moving stations must therefore be removed during the operation of fitting the tyre on the rim: in practice, the stage of fitting a tyre on a rim designed to house at least one moving station according to the present invention is carried out in the following stages:

an airtight sealing element is inserted in each hole present on the rim for housing the moving stations, this element generally being a screw plug interchangeable with the said station;

the tyre is fitted on the rim by making the beads of the tyre pass in succession over the same flange of the rim and bringing the said beads to the start of the conical surfaces which axially delimit the inner edges of the bead seats;

pressurized air is admitted to the tyre in such a way that each bead is brought on to the corresponding bead seat, and bears on the said flanges located at the axially opposite edges of the rim;

the tyre is deflated and the sealing elements are replaced with the moving stations;

the tyre is inflated to the desired pressure.

The sealing elements are only required to ensure airtightness, to allow the beads to be forced into the corresponding seats, and therefore they do not need to project radially into the cavity of the tyre: thus they allow the beads of the tyre to slide easily over the surface of the rim until they reach the specified fitting position.

What is claimed is:

1. A system for monitoring deformations of a moving tyre mounted on a rim associated with a vehicle, comprising:

a moving station; and a fixed station;

wherein the moving station is operatively coupled to the rim, wherein the moving station measures, at least intermittently and at least one direction, a distance between the moving station and an inner surface of the tyre, wherein the fixed station is operatively coupled to the vehicle, wherein the fixed station receives from the moving station, at least intermittently, at least one first signal associated with the measurement, and wherein the moving station measures the distance within a time interval when a first antenna associated with the moving station and a second antenna associated with the fixed station are in proximity to each other.

2. The system of claim 1, wherein the moving station comprises at least one first sensor that transmits, at least intermittently, at least one second signal within the tyre in a predetermined direction, and receives one or more reflections of the at least one second signal from the inner surface of the tyre.

3. The system of claim 2, wherein the at least one second signal comprises one or more sound waves.

4. The system of claim 2, wherein the at least one second signal comprises one or more optical beams.

5. The system of claim 2, wherein the at least one second signal comprises one or more electromagnetic waves.

6. The system of claim 2, wherein the at least one first sensor comprises a first electronic circuit board, and wherein the first electronic circuit board comprises:

a beam emitting device; and a beam receiving device.

7. The system of claim 6, wherein the first electronic circuit board comprises:

the first antenna;

a power-supply unit;

a drive circuit for the beam emitting device;

a drive circuit for the beam receiving device; and a circuit for reading at least one third signal from the beam receiving device;

wherein the first antenna is electrically connected to the power-supply unit, wherein the power-supply unit supplies power to the drive circuit or the beam emitting device, and wherein the power-supply unit supplies power to the drive circuit or the beam receiving device.

8. The system of claim 2, wherein the at least one first sensor comprises a first electronic circuit board, and wherein the first electronic circuit board comprises:

a beam emitting device;

a first lens;

a second lens; and a beam receiving device.

9. The system of claim 8, wherein the first electronic circuit board comprises:

the first antenna;

a power-supply unit;

a drive circuit for the beam emitting device;

a drive circuit for the beam receiving device; and a circuit for reading at least one third signal from the beam receiving device;

wherein the first antenna is electrically connected to the power-supply unit, wherein the power-supply unit supplies power to the drive circuit for the beam emitting device, and wherein the power-supply unit supplies power to the drive circuit or the beam receiving device.

10. The system of claim 2, wherein the at least one first sensor comprises a first electronic circuit board, and wherein the first electronic circuit board comprises:

an optical-beam emitting device;

a first lens;

a second lens; and an optical-beam receiving device.

11. The system of claim 10, wherein the first electronic circuit board comprises:

the first antenna;

a power-supply unit;

a drive circuit for the optical-beam emitting device;

a drive circuit for the optical-beam receiving device; and a circuit for reading at least one third signal from the optical-beam receiving device;

wherein the first antenna is electrically connected to the power-supply unit, wherein the power-supply unit supplies power to the drive circuit for the optical-beam emitting device, and wherein the power-supply unit supplies power to the drive circuit for the optical-beam receiving device.

12. The system of claim 10, wherein the optical-beam emitting device comprises a light-emitting diode (LED).

13. The system of claim 10, wherein the optical-beam receiving device comprises a pair of p-i-n diodes.

14. The system of claim 1, wherein the moving station comprises at least one first sensor that transmits, at least intermittently, at least one second signal within the tyre in a predetermined direction, and wherein the moving station further comprises at least one second sensor that receives one or more reflections of the at least one second signal from the inner surface of the tyre.

15. The system of claim 14, wherein the at least one second signal comprises one or more sound waves.

16. The system of claim 14, wherein the at least one second signal comprises one or more optical beams.

17. The system of claim 14, wherein the at least one second signal comprises one or more electromagnetic waves.

18. The system of claim 14, wherein the at least one first sensor comprises a first electronic circuit board, and wherein the first electronic circuit board comprises:

a beam emitting device; and a beam receiving device.

19. The system of claim 18, wherein the first electronic circuit board comprises:

the first antenna;

a power-supply unit;

a drive circuit for the beam emitting device;

a drive circuit for the beam receiving device; and a circuit for reading at least one third signal from the beam receiving device;

wherein the first antenna is electrically connected to the power-supply unit, wherein the power-supply unit supplies power to the drive circuit for the beam emitting device, and wherein the power-supply unit supplies power to the drive circuit for the beam receiving device.

20. The system of claim 14, wherein the at least one first sensor comprises a first electronic circuit board, and
wherein the first electronic circuit board comprises:
a beam emitting device;
a first lens;
a second lens; and
a beam receiving device.

21. The system of claim 20, wherein the first electronic circuit board comprises:
the first antenna;
a power-supply unit;
a drive circuit for the beam emitting device;
a drive circuit for the beam receiving device; and
a circuit for reading at least one third signal from the beam receiving device;
wherein the first antenna is electrically connected to the power-supply unit,
wherein the power-supply unit supplies power to the drive circuit for the beam emitting device, and
wherein the power-supply unit supplies power to the drive circuit for the beam receiving device.

22. The system of claim 14, wherein the at least one first sensor comprises a first electronic circuit board, and
wherein the first electronic circuit board comprises:
an optical-beam emitting device;
a first lens;
a second lens; and
an optical-beam receiving device.

23. The system of claim 22, wherein the first electronic circuit board comprises:
the first antenna;
a power-supply unit;
a drive circuit for the optical-beam emitting device;
a drive circuit for the optical-beam receiving device; and
a circuit for reading at least one third signal from the optical-beam receiving device;
wherein the first antenna is electrically connected to the power-supply unit,
wherein the power-supply unit supplies power to the drive circuit for the optical-beam emitting device, and
wherein the power-supply unit supplies power to the drive circuit for the optical-beam receiving device.

24. The system of claim 22, wherein the optical-beam emitting device comprises an LED.

25. The system of claim 22, wherein the optical-beam device comprises a pair of p-i-n diodes.

26. The system of claim 1, wherein the fixed station enables the moving station to measure the distance.

27. The system of claim 1, wherein the at least one first signal comprises a processed signal.

28. The system of claim 1, wherein the fixed station is powered by a battery of the vehicle.

29. A method for monitoring deformations of a moving tyre mounted on a rim associated with a vehicle, comprising the steps of:
enabling a moving station to measure, at least intermittently and in at least one direction, a distance between the moving station and an inner surface of the tyre; and
transmitting at least one signal associated with the measurement from the moving station; and receiving the at least one signal at a fixed station;
wherein the moving station is operatively coupled to the rim,
wherein the fixed station is operatively coupled to the vehicle, and
wherein the moving station measures the distance within a time interval when a first antenna associated with the moving station and a second antenna associated with the fixed station are in proximity to each other.

30. The method of claim 29, further comprising the step of processing information associated with the measurement before transmitting the at least one signal from the moving station to the fixed station.

31. The method of claim 29, wherein the step of enabling the moving station comprises measuring the distance when the moving station is in a proximity of a footprint area of the tyre.

32. The method of claim 29, wherein the steps of enabling the moving station and transmitting the at least one signal occur within the time interval when the first antenna and the second antenna are in proximity to each other.

33. The method of claim 29, wherein the step of enabling the moving station comprises supplying power to the moving station when the moving station is in a proximity of a footprint area of the tyre.

34. The method of claim 29, wherein the step of enabling the moving station comprises supplying power to the moving station within the time interval when the first antenna and the second antenna are in proximity to each other.

35. The method of claim 29, wherein the step of transmitting the at least one signal comprises generating a magnetic field corresponding to the at least one signal in a proximity of the first antenna.

36. The method of claim 29, wherein the step of receiving the at least one signal comprises detecting a magnetic field corresponding to the at least one signal in a proximity of the second antenna.

37. A method for monitoring deformations of a moving tyre mounted on a rim associated with a vehicle, comprising the steps of:
enabling a moving station to transmit at least one first signal when the moving station is in a proximity of a footprint area of the tyre;
transmitting the at least one first signal, at least intermittently and in at least one direction, within the tyre;
reflecting the at least one first signal from an inner surface of the tyre;
receiving the reflected at least one first signal; and
processing information associated with the reflected at least one first signal to measure a distance between the moving station and the inner surface of the tyre;
wherein the moving station is operatively coupled to the rim.

38. The method of claim 37, further comprising the step of:
transmitting at least one second signal associated with the measurement from the moving station; and
receiving the at least one second signal at a fixed station;
wherein the fixed station is operatively coupled to the vehicle.

39. The method of claim 38, wherein the step of processing information occurs before the step of transmitting the at least one second signal.

40. The method of claim 38, wherein the step of processing information occurs after the step of receiving the at least one second signal.

41. The method of claim 38, wherein the steps of enabling the moving station, transmitting the at least one first signal, reflecting the at least one first signal, receiving the reflected at least one first signal, transmitting the at least one second signal, and receiving the at least one second signal occur when the moving station is in the proximity of the footprint area of the tyre.

42. The method of claim 38, wherein the steps of enabling the moving station, transmitting the at least one first signal, reflecting the at least one first signal, receiving the reflected at least one first signal, transmitting the at least one second signal, and receiving the at least one second signal occur within a time interval when a first antenna associated with the moving station and a second antenna associated with the fixed station are in proximity to each other.

43. The method of claim 38, wherein the step of receiving the at least one second signal comprises detecting a magnetic field corresponding to the at least one second signal in a proximity of a second antenna associated with the fixed station.

44. The method of claim 37, wherein the steps of enabling the moving station, transmitting the at least one first signal, reflecting the at least one first signal, and receiving the reflected at least one first signal occur when the moving station is in the proximity of the footprint area of the tyre.

45. The method of claim 37, wherein the steps of enabling the moving station, transmitting the at least one first signal, reflecting the at least one first signal, and receiving the reflected at least one first signal occur within a time interval when a first antenna associated with the moving station and a second antenna associated with a fixed station are in proximity to each other.

46. The method of claim 37, wherein the step of enabling the moving station comprises supplying power to the moving station when the moving station is in the proximity of the footprint area of the tyre.

47. The method of claim 37, wherein the step of enabling the moving station comprises supplying power to the moving station within a time interval when a first antenna associated with the moving station and a second antenna associated with a fixed station are in proximity to each other.

48. The method of claim 38, wherein the step of transmitting the at least one second signal comprises generating a magnetic field corresponding to the at least one second signal in a proximity of a first antenna associated with the moving station.

* * * * *

UNITED STATES PATENT AND TRADEMARK OFFICE
CERTIFICATE OF CORRECTION

PATENT NO. : 6,959,592 B2
DATED : November 1, 2005
INVENTOR(S) : Renato Caretta

It is certified that error appears in the above-identified patent and that said Letters Patent is hereby corrected as shown below:

Column 18,
Line 55, "the step" should read -- the steps --.

Signed and Sealed this

Twenty-third Day of May, 2006

JON W. DUDAS
*Director of the United States Patent and Trademark Office*